United States Patent [19]
Samsavar et al.

[11] Patent Number: 5,866,806
[45] Date of Patent: Feb. 2, 1999

[54] SYSTEM FOR LOCATING A FEATURE OF A SURFACE

[75] Inventors: Amin Samsavar, Sunnyvale; Jian-Ping Zhuang, Santa Clara; Jason Schneir, San Jose, all of Calif.

[73] Assignee: KLA-Tencor Corporation, San Jose, Calif.

[21] Appl. No.: 728,480

[22] Filed: Oct. 11, 1996

[51] Int. Cl.⁶ .................................................. G01N 27/00
[52] U.S. Cl. ............................................................. 73/105
[58] Field of Search .............................. 73/105; 250/306, 250/307; 33/556, 558

[56] References Cited

U.S. PATENT DOCUMENTS

| | | |
|---|---|---|
| 2,728,222 | 12/1955 | Becker et al. . |
| 4,724,318 | 2/1988 | Binnig . |
| 5,144,833 | 9/1992 | Amer et al. . |
| 5,229,606 | 7/1993 | Elings et al. . |
| 5,266,801 | 11/1993 | Elings et al. . |
| 5,309,755 | 5/1994 | Wheeler . |
| 5,345,816 | 9/1994 | Clabes et al. . |
| 5,347,854 | 9/1994 | Martin et al. . |
| 5,400,647 | 3/1995 | Elings ........................................ 73/105 |
| 5,418,363 | 5/1995 | Elings et al. . |
| 5,567,872 | 10/1996 | Kyogaku et al. .......................... 73/105 |

OTHER PUBLICATIONS

"Scanning Tunneling Microscope Computer Automation," J. Becker, *Surface Science*, 181 (1987) pp. 200–209.

"Computer Automation for Scanning Tunneling Microscopy," P. Schroer et al., *IMB J. Res. Develop.*, vol. 30, No. 5, Sep. 1986, pp. 543–552.

"A Stand–Alone Scanning Force and Friction Microscope," M. Hipp et al., *Ultramicroscopy*, 42–44(1992), pp. 1498–1503.

*Primary Examiner*—Robert Raevis
*Attorney, Agent, or Firm*—Majestic, Parsons, Siebert & Hsue P.C.

[57] ABSTRACT

A probe tip of a scanning probe microscope or a profilometer is scanned across a surface in a contact, non-contact, or intermittent contact mode to sense the presence of a feature to be located. The probe tip may be scanned along substantially parallel paths, spiral paths or in a sequence of random positions to locate the feature. After the feature has been located, a different searching sequence is employed in order to locate a center of the feature if such is desired. Then, the probe tip is scanned across the surface over the center of the feature in order to perform a measurement of the feature. For some particular features such as tungsten plugs, metal clusters or metal filled via holes of a surface, an electrical or magnetic parameter of the feature may be used for locating the feature after which the same or a different characteristic of the feature, such as geometric profile, can be measured.

35 Claims, 10 Drawing Sheets

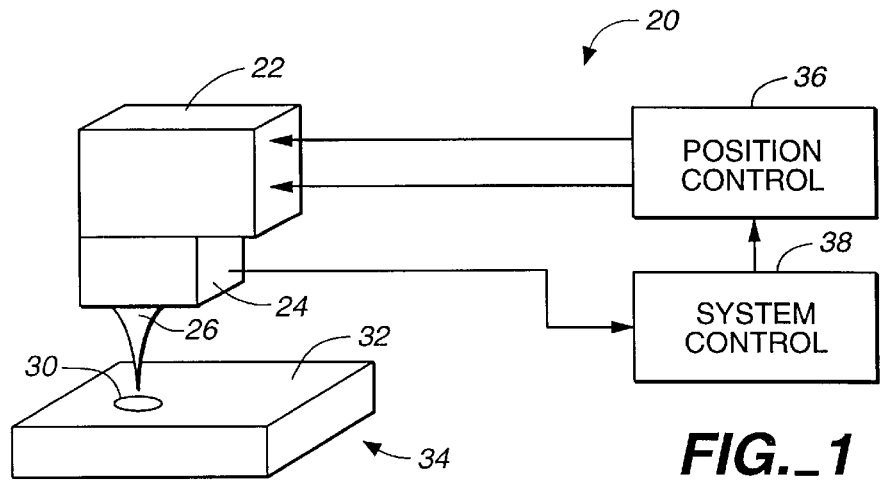
FIG._1
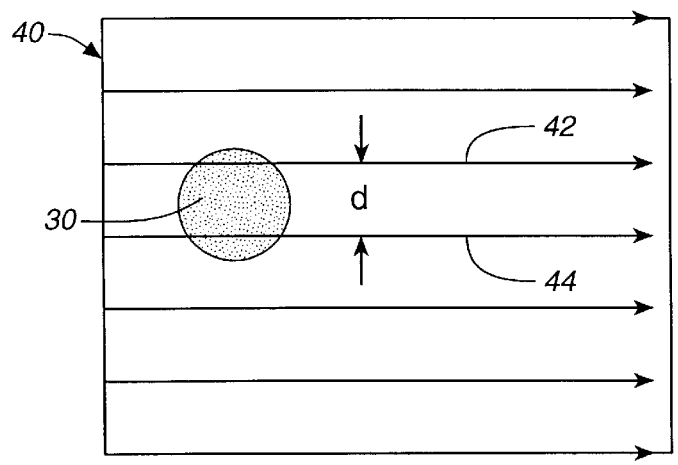
FIG._2
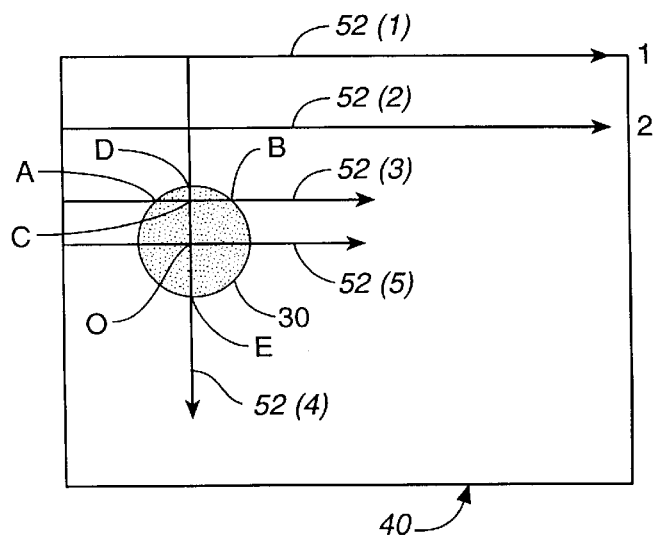
FIG._3

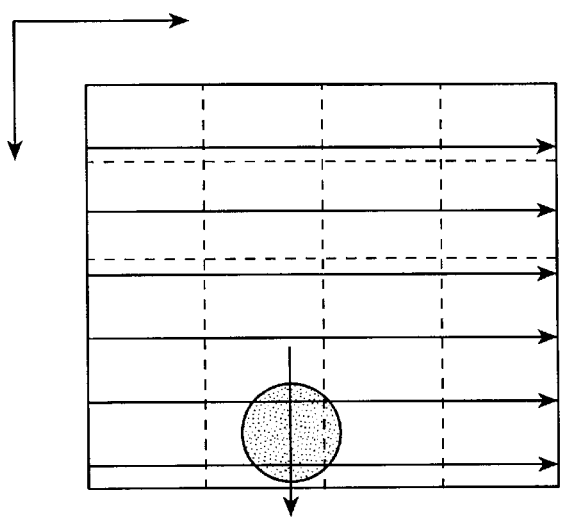
FIG._4
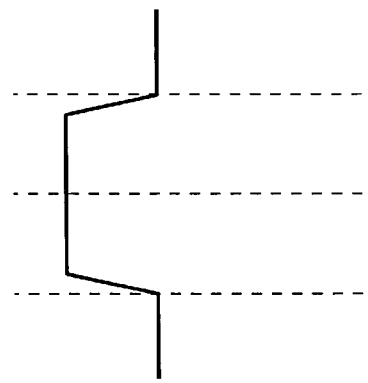
FIG._5
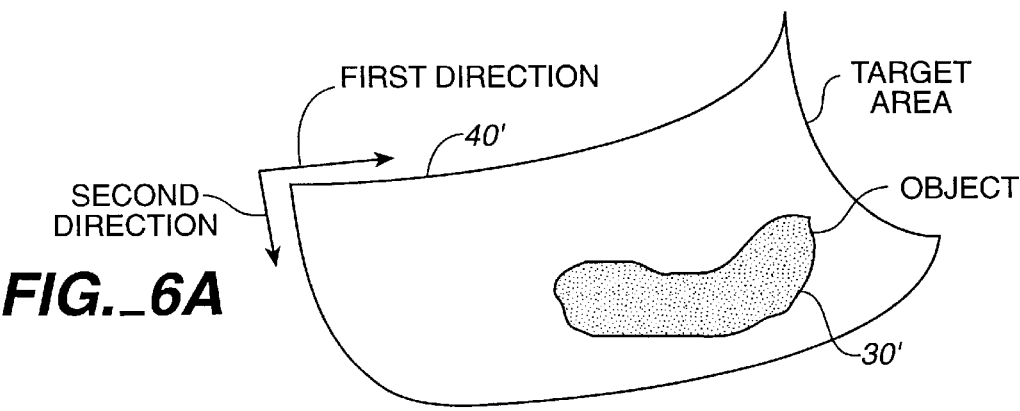
FIG._6A
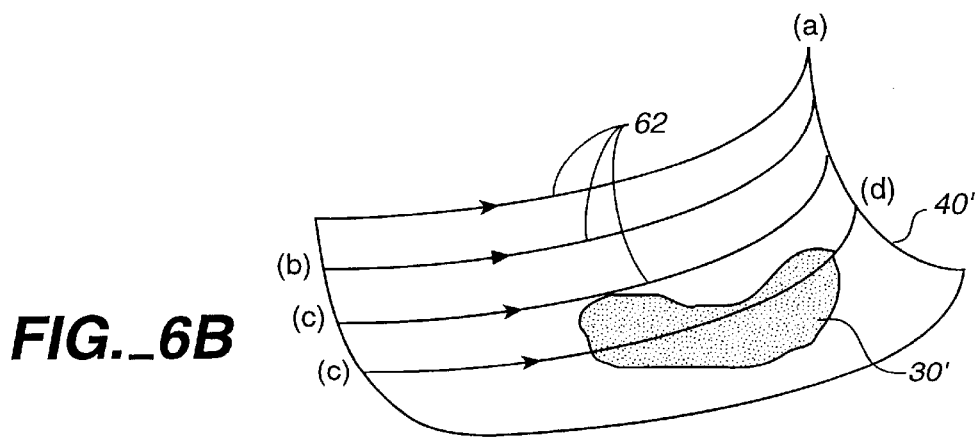
FIG._6B

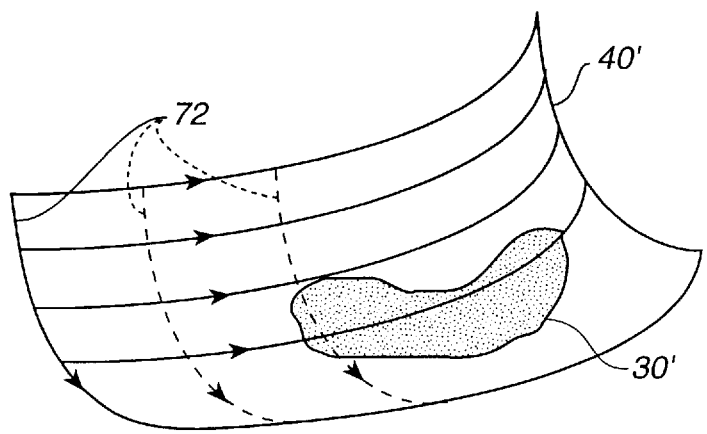
FIG._6C
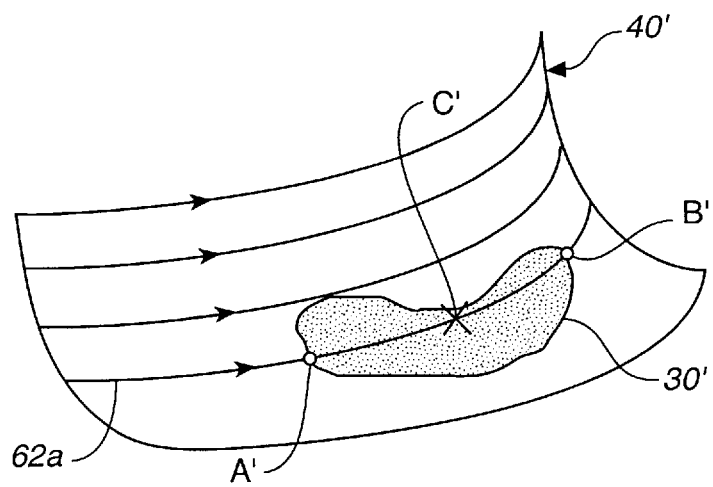
FIG._6D
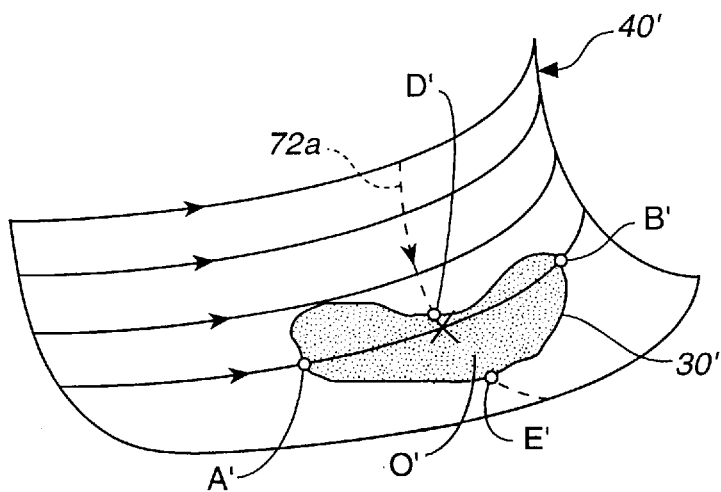
FIG._6E

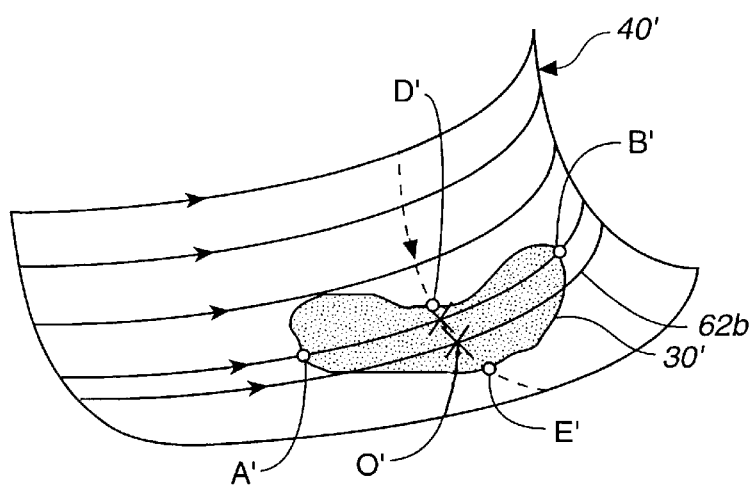
FIG._6F
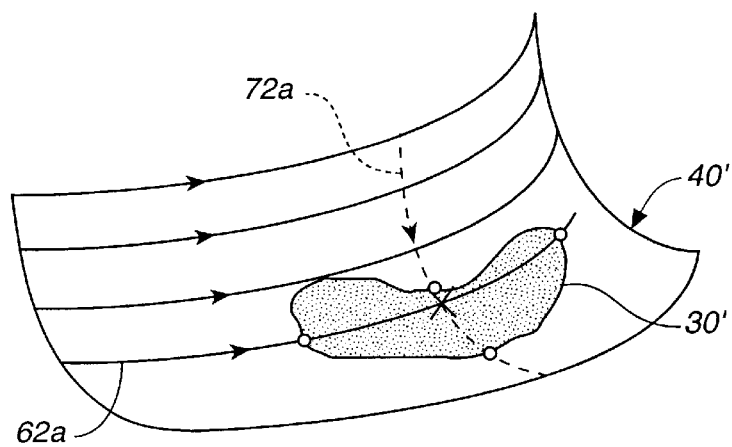
FIG._6G
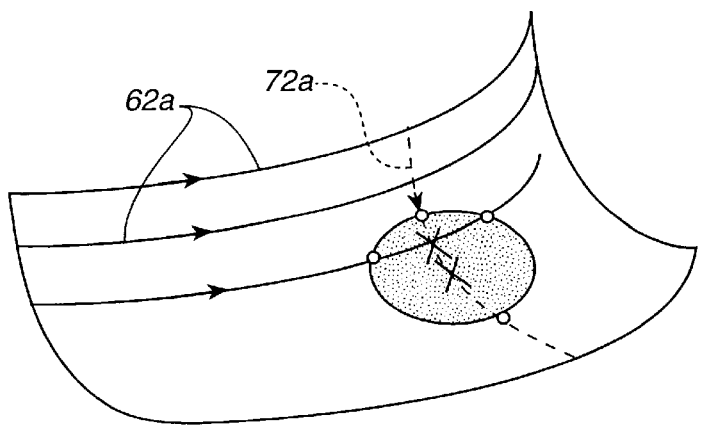
FIG._6H

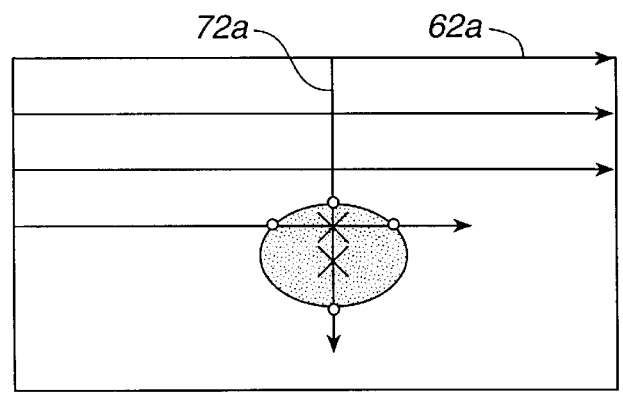
FIG._6I
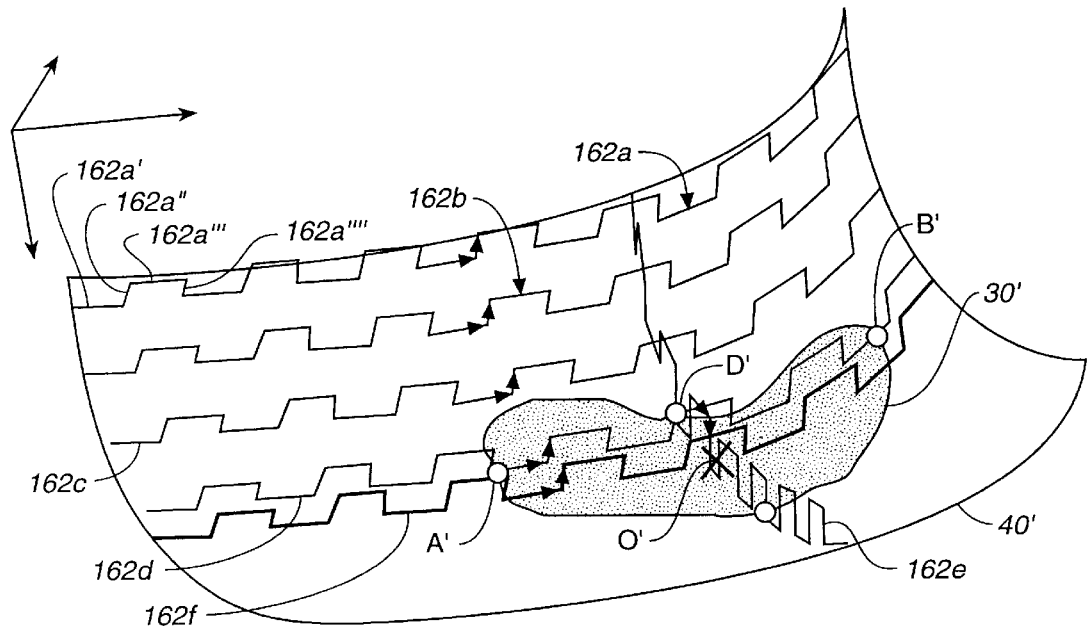
FIG._7A

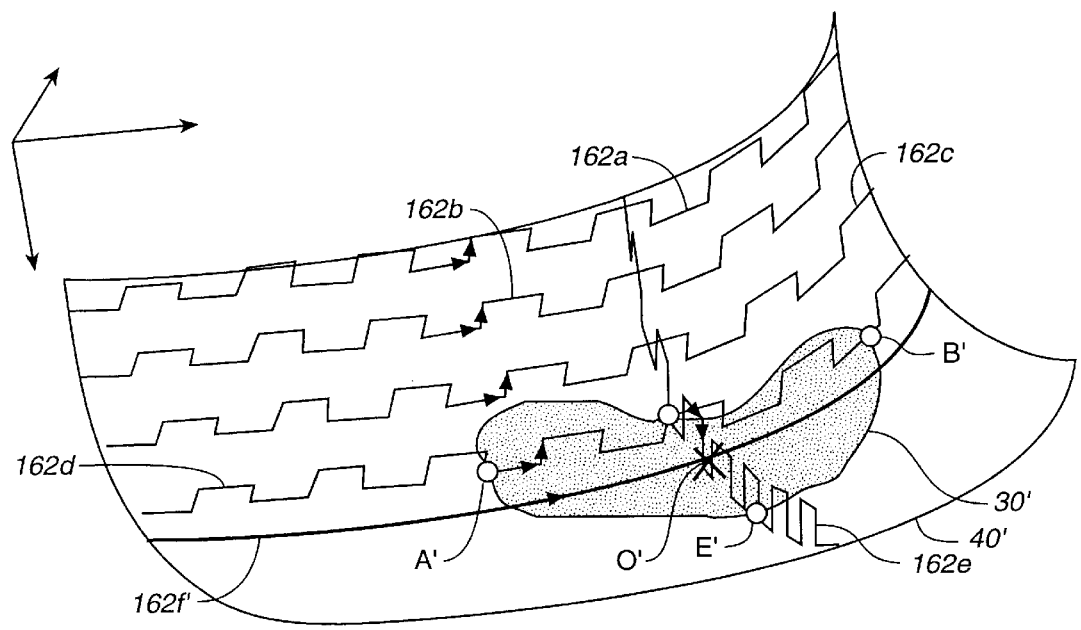
FIG._7B
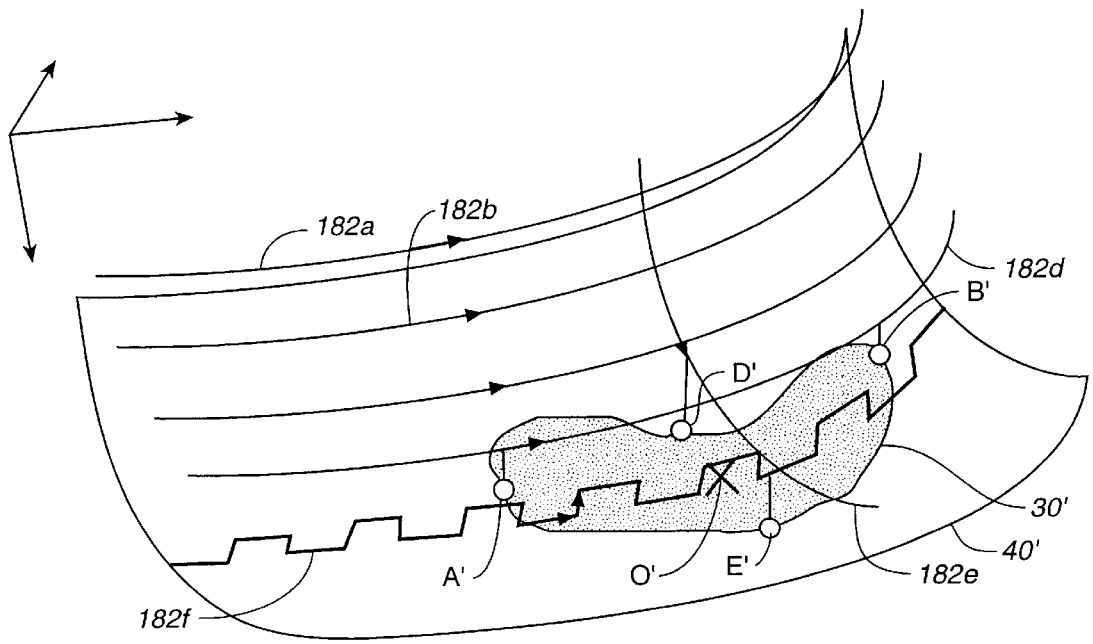
FIG._7C

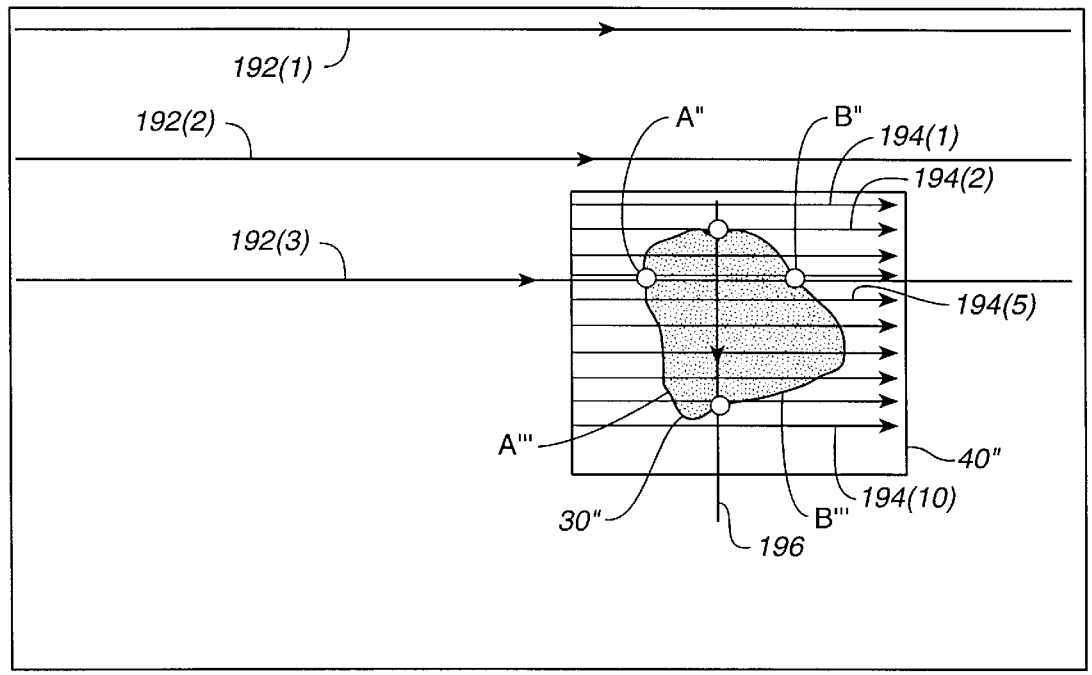
FIG._7D
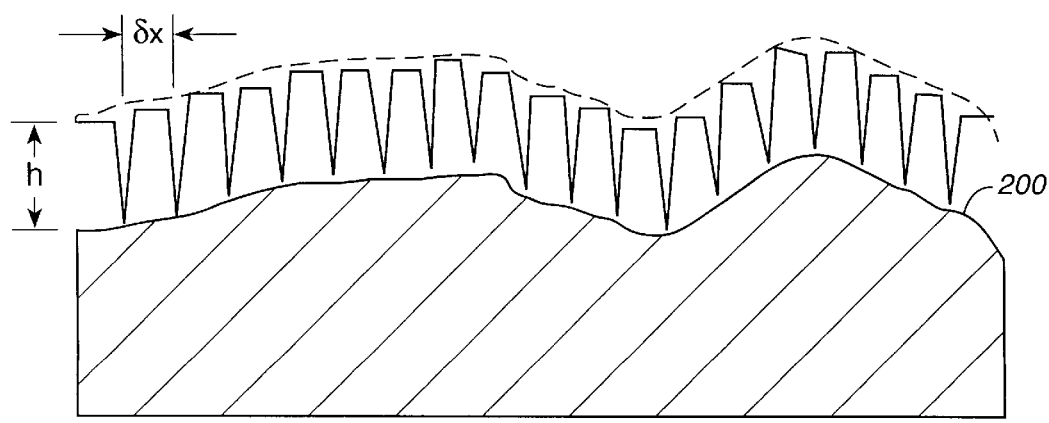
FIG._8A

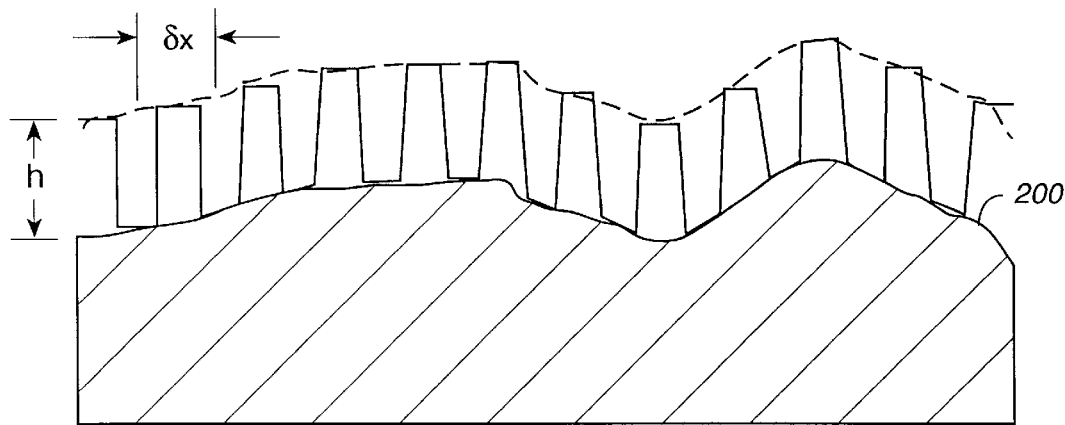
FIG._8B
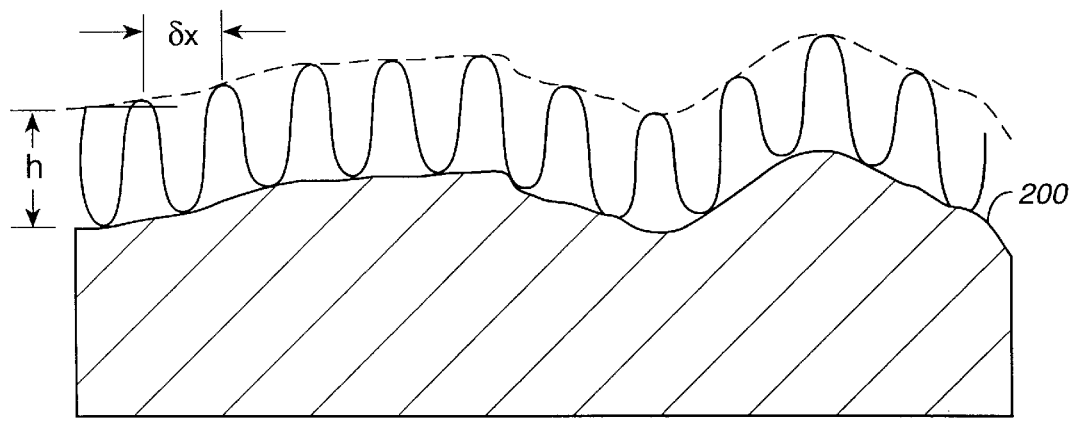
FIG.-8C
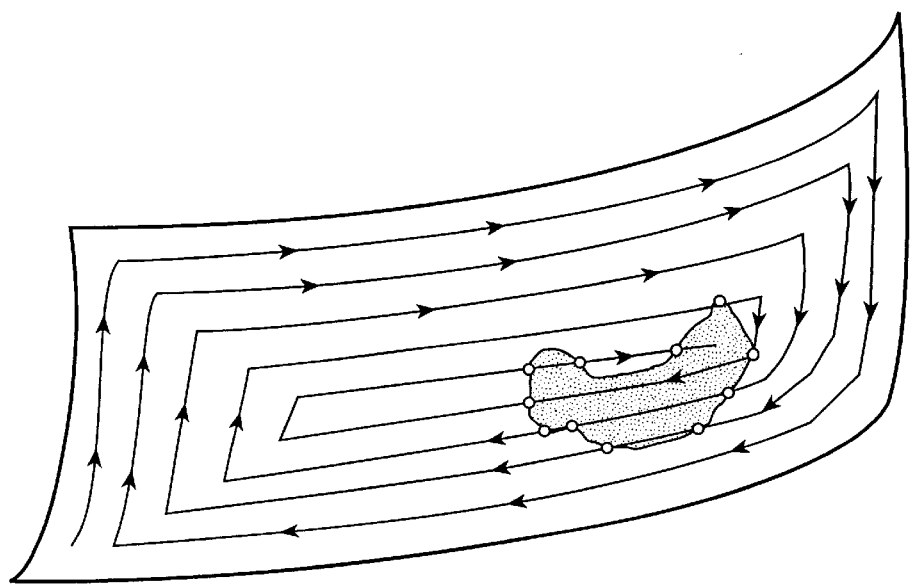
FIG._11

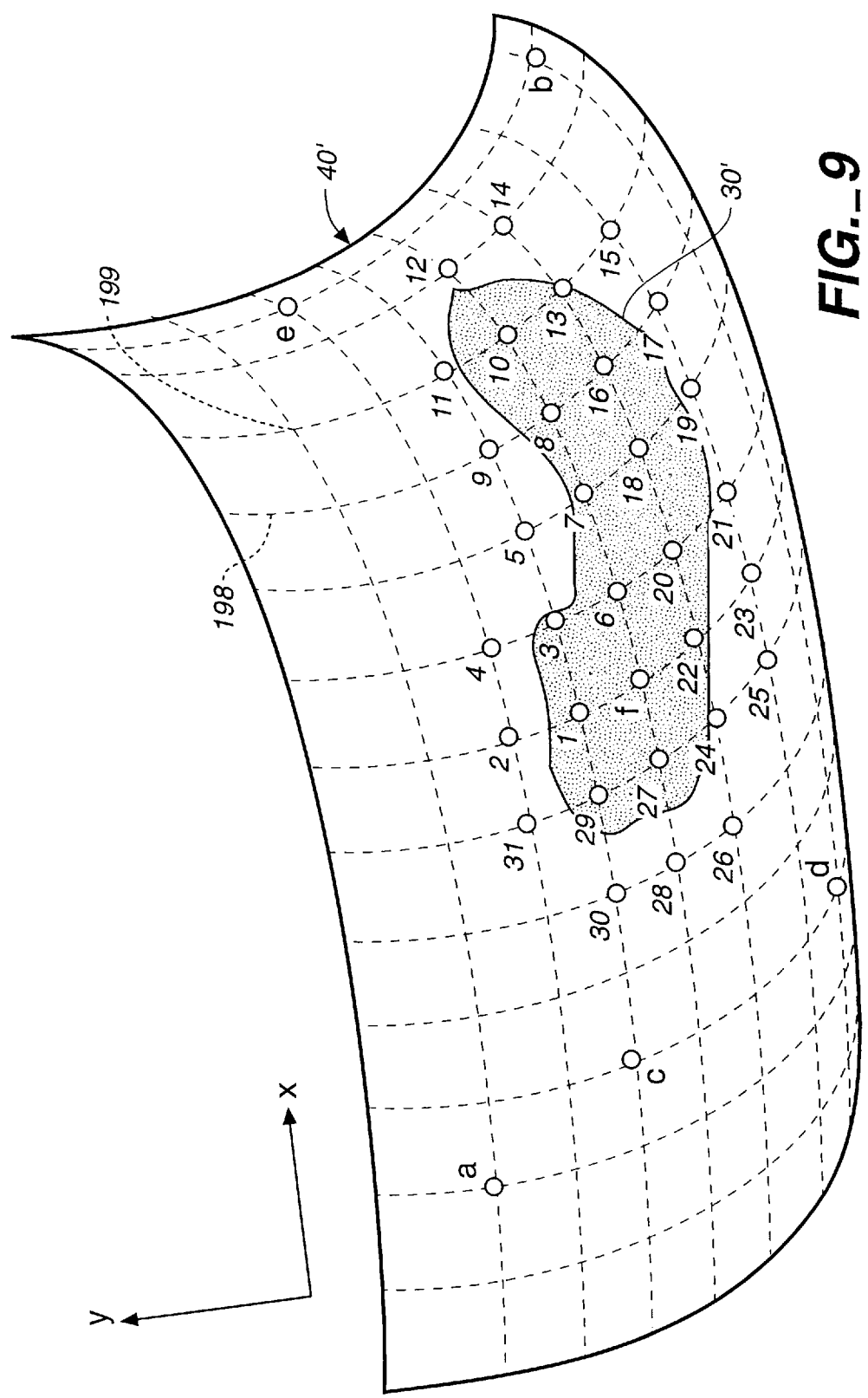
FIG._9

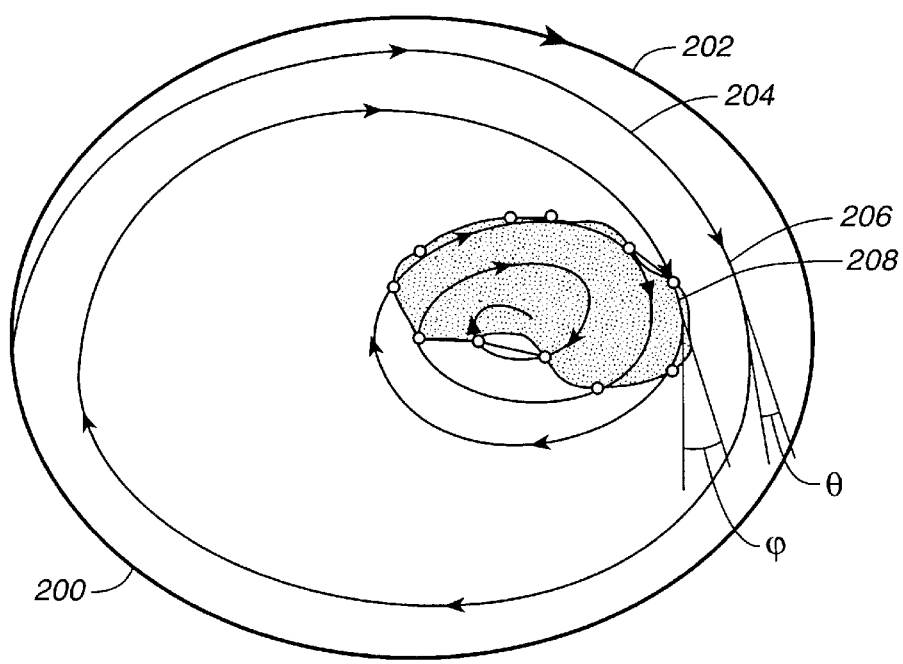
FIG._10
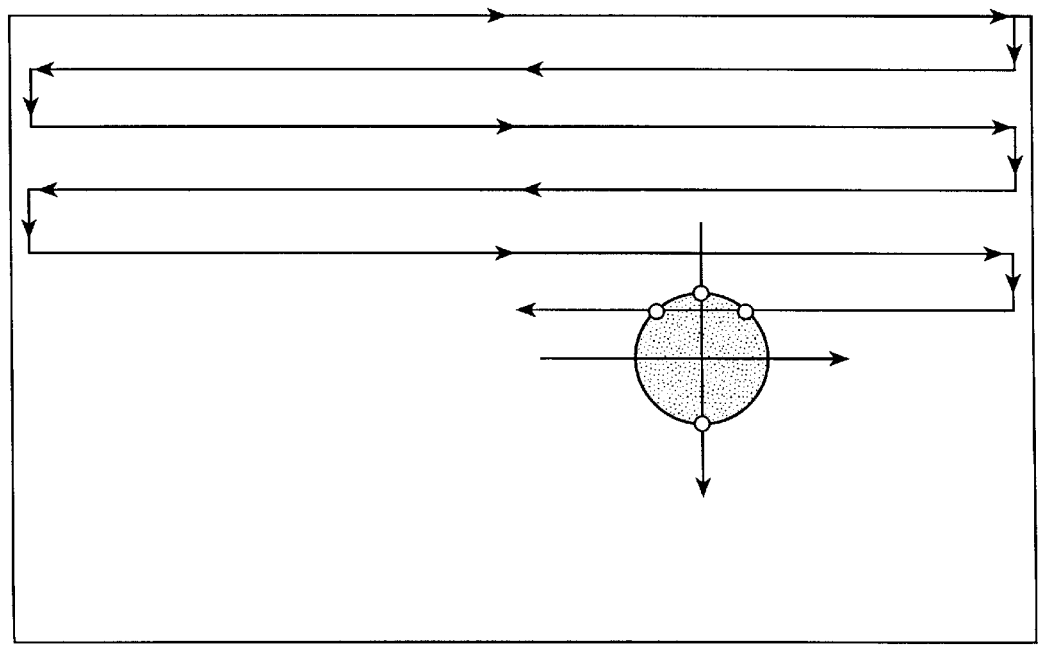
FIG._12

SYSTEM FOR LOCATING A FEATURE OF A SURFACE

BACKGROUND OF THE INVENTION

This invention relates in general to systems for inspecting surfaces and in particular, to a system for locating features of a surface.

Stylus profilometers and/or scanning probe microscopes have been used for inspecting features of surfaces, where such features may include the topography, dimensional information, electrical resistance or capacitance or magnetic characteristics, frictional properties, van der Waals forces, light emission or transmission behavior and other physical properties.

In order to locate one or more of such features, optical techniques using video cameras, objective lenses, and pattern recognition have conventionally been employed. These techniques are limited by the resolution of the optics and of the camera, the optical magnification power of the optics, the illumination angle and pattern recognition software algorithms. Even with a high power objective lens and using the most robust pattern recognition software available at present, an object can still fail to be located optically to a desired degree of accuracy. After the feature has been located optically, the stylus tip of the scanning probe microscope or of the profilometer is then moved to a desired location relative to the feature in order to measure the feature. If optical techniques are used to position the feature relative to the stylus tip, the stylus may hinder the path of view of the optics for precise positioning of the feature under the stylus. If the positioning of the feature is performed using a "coarse stage", the repeatability of the positioning of large stages, such as wafer or disk handling stages, is somewhat limited to about 0.25 microns so that the object cannot be positioned to an accuracy better than 0.25 microns.

Due to the uncertainties inherent in the positioning procedure described above, the user cannot be certain as to the position of the stylus tip relative to the feature to be measured. For this reason, in conventional methods, even after the stylus tip has been located roughly close to the feature to be measured, more accurate positioning still needs to be achieved. One must first designate a window or area of interest that contains the feature and acquire high resolution two-dimensional or three-dimensional data of the feature within such window or target area. The stylus tip and sensor are used to acquire high resolution two-dimensional or three-dimensional data in an area containing the feature of interest. The data is then examined for an indication of the feature of interest, and the data is used to position the stylus tip at the exact location of interest. It is only at such point that the user is then ready to use the stylus tip to measure the feature.

The above-described technique for positioning the stylus tip in position to measure the feature has several shortcomings. If the feature is not one that can be located optically, the above-described optical technique cannot be used. Even for features that can be optically located, the above-described procedure is time consuming and wasteful of resources. Due to the uncertainty inherent in the optical technique, conventional positioning techniques require the acquisition of the full image within a target area in the manner described above. For example, if a scanning probe microscope is used to acquire a 256×256 data point full image, such data acquisition typically requires four to five minutes. Most of these data points will be discarded after the feature is located. Therefore, the above-described process is limited in throughput and is wasteful of the user's resources. It is, therefore, desirable to provide an improved system for locating and then measuring a feature of interest, where the system can be used even when the feature is not optically detectable.

SUMMARY OF THE INVENTION

One aspect of the invention is directed towards a method for locating a feature of a surface, comprising the steps of: (a) defining a target area of the surface for sensing of the feature of the surface; (b) scanning a probe tip of a profilometer or scanning probe microscope over the target area of the surface and sensing the feature; and (c) stopping scanning the tip after the feature has been sensed by the probe tip, irrespective of whether the entire target area has been scanned.

Another aspect of the invention is directed towards a method for locating and measuring a feature of a surface. This method comprises the three steps (a), (b) and (c) of the method of the previous paragraph. In addition, it also includes the step of measuring the feature.

Another aspect of the invention is directed towards a method for locating a feature on or in a surface, where the feature includes an electrically conductive plug, via or cluster. The method comprises the steps (a), (b) and (c) described above.

Still another aspect of the invention is directed towards a method for locating and measuring a feature on or in a surface, said feature including an electrically conductive plug, via or cluster. The method comprises the three steps of the immediately preceding paragraph, and in addition the step of measuring the feature.

On more aspect of the invention is directed towards a method for locating a feature on or in a surface of a laser textured hard disk, said feature including a bump or valley. The method comprises the steps (a), (b) and (c) referenced above.

An additional aspect of the invention is directed toward a method for locating and measuring a feature on or in a surface of a laser textured hard disk, the feature including a bump or valley. The method includes the three steps of the immediately preceding paragraph, and in addition, the step of measuring the feature.

Still another aspect of the invention is directed towards a method for locating a feature on or in a surface, aid feature including a magnetic domain. The method comprises the steps (a), (b) and (c) referenced above.

Yet one additional aspect of the invention is directed towards a method for locating and measuring a feature on or in a surface, said feature including a magnetic domain. The method comprises the three steps of the immediately preceding paragraph, and in addition, the step of measuring the feature.

BRIEF DESCRIPTION OF THE DRAWINGS

FIG. 1 is a block diagram of a surface measurement system useful for illustrating the invention.

FIG. 2 is a schematic view of a target area of a surface having a feature and search paths thereon to illustrate the method for locating the feature of this invention.

FIG. 3 is a schematic view of a target area of a surface and search paths thereon illustrating a method for searching the feature of FIG. 2 to illustrate the invention.

FIG. 4 is a schematic view of a target area of the surface having a feature and search paths thereon illustrating a method of this invention.

FIG. 5 is a representative cross-sectional view of a feature of the surface to illustrate the invention.

FIGS. 6A–I are schematic views of a target area of a surface having a feature therein and search paths thereon to illustrate a method for searching the feature as the preferred embodiment of the invention.

FIGS. 7A–7C are schematic views of a target area of a surface having a feature therein and search paths thereon to illustrate a searching method employing an intermittent contact mode in combination with contact or non-contact mode for illustrating another embodiment of the invention.

FIG. 7D is a schematic view of a larger and a smaller target area of a surface having a feature therein and search paths thereon in both target areas to illustrate searching method for illustrating yet another embodiment of the invention. The method can be used in contact mode, non-contact mode or intermittent contact mode.

FIGS. 8A–8C are cross-sectional views of a surface and intermittent search paths to illustrate another embodiment of the invention.

FIG. 9 is a schematic view of a target area of a surface and search paths thereon illustrating a searching method employing a sequence of random locations for finding the approximate location of the feature and a non-random algorhithm for locating the feature boundary once the approximate location of the feature has been located for illustrating still another alternative embodiment of the invention.

FIG. 10 is a schematic view of a spiral search path on a surface for searching a feature on or in a surface to illustrate still another alternative embodiment of the invention.

FIG. 11 is a schematic view of a substantially rectilinear spiral search path for locating the feature of a surface to illustrate one more alternative embodiment of the invention.

FIG. 12 is a schematic view of a serpentine search path for locating the feature of a surface to illustrate still one more alternative embodiment of the invention.

For simplicity, identical components are identified by the same numerals in this application and the figures.

DETAILED DESCRIPTION OF THE PREFERRED EMBODIMENTS

FIG. 1 illustrates a system for locating and measuring a feature of interest of a surface of a sample to illustrate the invention. As shown in FIG. 1, system 20 includes a scanner head 22, a sensor 24 and a stylus tip or probe tip 26 for sensing the feature of interest 30 on the surface 32 of a sample 34. The position of the probe 26 is controlled by a precision control block 36 which is controlled by a system control 38. System 20 may be a profilometer of the type described in U.S. Pat. No. 5,309,755 to Wheeler. In such event, probe 26 remains in contact with the surface 32 and moves up and down when the topology of the surface changes as the tip is moved across the surface. Sensor 24 then senses the changes of position of the tip of probe 26 in order to measure the topology of the surface 32.

System 20 can also be a scanning probe microscope, in which case the probe 26 may or may not be in contact with surface 32. Rather, the probe 26 is maintained at a predetermined distance from or in contact with surface 32 by moving the scanner, sensor and probe up and down by means of a feedback signal. The change in the feedback signal then gives an indication of the topology of the surface 32. One type of scanning probe microscope is illustrated in U.S. Pat. No. 4,724,318. The sensor 24 can also be a capacitance, magnetic force, van der Waals, electrical resistance or current sensor for sensing parameters in addition to the topology or topography of the surface. In such manner, even though a feature of interest may not be detectable optically, as long as the feature exhibits other detectable characteristics such as magnetic force, electrical capacitance or resistance or van der Waals type forces, the feature can still be located and measured.

FIG. 2 is a schematic view of a target area of a surface having a feature of interest 30 to illustrate the invention. First, a target area 40 on the surface is designated. When the dimensions of the feature to be located are known, it may be desirable to scan the probe 26 along lines that are substantially parallel, where the spacing d between adjacent lines is less than the expected dimensions of the feature to be sensed as illustrated in FIG. 2. As shown in FIG. 2, probe 26 may be scanned along seven scan lines where the separation d between adjacent scan lines such as 42 and 44 is less than the expected dimensions of the feature. In FIG. 2, the separation d is about 75% of the expected dimensions of the feature. The spacing is chosen to maximize throughput but without causing the scan to miss the feature. Preferably, such spacing is in the range of 50 to 85% of the expected dimensions of the feature.

For many features of interest, it may be important not only to locate the feature, but also a center of the feature. Thus, for tungsten plugs, vias or clusters of and electrical conductive material, bumps or valleys on the surface of a textured hard disk, or pull tip recessions of a read/write head, it is useful or sometimes important to detect the center of such features and perform the measurement having the probe at the center of the feature. FIG. 3 is a schematic view of window or target area 40 of a surface having a feature 30 thereon or therein to illustrate a searching method for locating the center of the feature. As shown in FIG. 3, the probe tip is first scanned along the scan line segment 52(1), followed by scanning along line segment 52(2), scan line segment 52(3) and additional line segments if necessary, where segments 52(2), 52(3) and the additional line segments are substantially parallel to segment 52(1). When the probe is scanned along such line segments, sensor 24 is used to sense the feature 30, be it topology, electrical resistance or capacitance, magnetic force, van der Waals forces, or other features with detectable characteristics. Thus, when the tip of probe 26 is scanned along scan line segment 52(3), sensor 24 senses the feature 30. Sensor 24 not only senses the presence of feature 30 but also the boundary points A, B of feature 30 along the scan line segment 52(3) and sends its output to system control 38 to so indicate.

Once the sensor 24 senses the presence of feature 30, system control 38 instructs position control circuit 36 to stop the scanning motion along scan line segment 52(3) even though some parts of the area 40 remains unscanned. The boundary points A, B are noted and the mid-point C between points A, B is determined, and system control 38 and position control 36 cause the scanner 22 to scan along scan line segment 52(4) instead where the scan line segment 52(4) passes through point C and is transverse to the scan line segments 52(1)–52(3). The sensor 24 senses the boundaries D, E of the feature 30 along the scan line segment 52(4). Then the mid-point O of the portion of the line segment 52(4) between points D, E is determined to be the center of feature 30 and the controls 36, 38 cause the scanner 22 to move the probe along scan line segment 52(5), that is, through the center O of the feature 30, in order to measure the feature. System control 38 records the output of sensor 24 and determines the locations of points A, B, C, D, E and O. The boundary points A, B, D, E may be found by sensing variations in the feature over the surface.

Where it is not important to determine the center of the feature and to measure the feature at its center, the above searching process may be terminated after the feature 30 has been found when scanning along scan line segment 52(3). The feature can simply be measured, such as at point C.

From the above procedure, it is evident that the searching method of this invention is superior to the conventional search technique. Since no optical system separate and apart from system 20 is used for locating the approximate location of feature 30, the searching method of this invention is not limited by the resolution or power of a optical system employing one or more lenses. Since the instrument for measuring the feature is used also for locating the feature, the method of this invention avoids the need to locate the measuring probe and sensor relative to the feature after the feature has been located. Furthermore, there is no need to acquire data over the entire target area 40 before the location of the feature can be accurately determined. Instead, once the feature has been discovered, there is no need to scan the remainder of the unscanned portion of the target area and the user can proceed immediately to measure the feature. This greatly improves throughput and avoids wasting the user's resources.

The advantages of this invention can be seen more clearly by reference to a concrete example. The feature of interest is an object of one micron diameter. Assuming that it is possible to first identify the feature to an accuracy of plus or minus two microns, this means that the object can be located initially at best to within a target area of four microns by four microns. One can then scan this target area along scan line segments of length of four microns along the x direction and moving the probe 26 in the y direction by an offset of 0.75 microns each time until one of the scan lines crosses the object of interest. This means that a maximum of 5 scan lines are required to cross the object in FIG. 4. Once the scan line crosses the object of interest, then similar steps as those described above in FIG. 3 can be taken to determine the apparent center of the feature. This means that after a maximum of six scans, the center of the object is located and the measurement of the feature can proceed. Even if the scan time of each of the four micron scan line segment amounts to one second, the maximum time required from the six scans with overhead can be of the order of ten seconds. In contrast, in order to acquire 256 data points on each of 256 scan lines at a rate of one line per second over a four micron by four micron areas such procedure would require four and one half minutes, where the data points on all but one of the 256 scan lines are wasted.

FIG. 5 is a representative cross-sectional view of a feature of the surface to illustrate the invention.

FIGS. 6A–I are schematic views of a target area of a surface containing a feature and search scan segments to illustrate an embodiment of the invention. As before, a target area 40' of a surface is defined that is known to contain the feature of interest 30' to be located and measured. Two directions for scanning are defined with scan line segments 62 along the first direction and scan line segments 72 along the second direction. The first and second directions are transverse to each other. As shown in FIGS. 6A–I, the target area 40' is on a surface which is not planar and the scan line segments 62 and 72 are curved line segments rather than straight line segments. Nevertheless, the same searching method can be employed to locate the feature 30' of the surface. Thus, as shown in FIG. 6D, the feature 30' is found when tip 26 is scanned along scan line segment 62a. Again, the boundary points A', B' sensed by sensor 24 are recorded by system control 38 and a mid-point C' between point A', B' along segment 62a is determined and the probe is caused to scan along scan line segment 72a in the second direction. System control 38 then records the boundary points D', E' sensed by the sensor 24 and the mid-point O' between points D', E' along segment 72a is determined to be the apparent center of feature 30'. Then the probe is caused to scan along scan line segment 62b where the feature 32' is measured by sensor 24.

FIG. 6G illustrates the scanning method where it is adequate to locate the feature without necessarily finding a center of the feature. In such event, the search can be ended after the feature is found. The feature can then be measured upon ending the search without having to further scan the surface. Alternatively, the feature can be measured along scan line segment 72a in FIG. 6G. Where the feature is symmetrical, as shown in FIG. 6H, the center of the feature is, in some applications, more meaningful and it can be important to measure the feature at such center. FIG. 6I illustrates the search method for a substantially rectangular window on a flat surface.

FIGS. 7A–7C are schematic views of a target area of a surface having a feature of interest and of scan paths operated in different modes, including non-contact, intermittent contact and contact modes to illustrate the invention. FIG. 7A is a schematic view of a target area and a scan path illustrating the intermittent contact mode. As shown in FIG. 7A, the tip of probe 26 is scanned along scan line segments 162a, 162b, 162c and 162d, where these scan line segments are substantially parallel to one another. As shown in FIG. 7A, the tip of probe 26 proceeds across the surface 40' along each scan line segment in an intermittent mode. In the case of scan line segment 162a, the probe proceeds first without contacting the surface, such as along portion 162a' of the segment 162a. Then the tip is dropped down towards the surface 40' until it contacts the surface along portion 162a", and then the tip is dragged along in substantially constant contact with surface 40' along portion 162a'". The tip is then again lifted from the surface along portion 162a"" and then the above-described cycle is repeated as the tip is moved across the surface 40' to trace out the scan line segment 162a. The other three scan line segments 162b, 162c, 162d are scanned by the tip in a similar manner. The advantage of an intermittent scan described above is that, in some applications, it speeds up the scanning process in comparison with an operation mode where the tip of the probe is in constant contact with the surface. This mode of operation also reduces possible damage to the probe tip and/or the surface due to frictional forces between the probe tip and the sample. The same is true for the non-contact mode in comparison to the intermittent contact or contact mode.

As before, the feature 30' is sensed when the probe tip is scanned along scan line segment 162d and the boundary points A', B' are noted and the mid-point of the portion of the line segment between points A', B' is noted and the probe tip is caused to be scanned along scan line or path segment 162e transverse to the other scan line segments as before to locate boundary points D', E' so as to locate the center of the feature 30' as before.

In some applications, it is advantageous to change the mode of operation after the approximate location of the feature has been found. Thus, where the feature to be sensed has two different characteristics that can be sensed differently, a first characteristic can be used when the surface is scanned to discover the approximate location of the feature, such as during scan paths 162a–162d. Then after the approximate location of the feature has been located, the user can switch to a different operational mode for sensing the center of the feature. Then the feature can be measured by means of either one of the two characteristics or any other characteristic that the feature may have. In many applications, however, it may be adequate to employ the same operational mode to find the approximate location of the feature as well as the center of the feature and use a different operational mode when the feature is actually measured. This is illustrated in FIGS. 7B and 7C.

As shown in FIG. 7B, the approximate location of feature 30' is found when the surface 40' is scanned using the probe tip along scan line segments 162a, 162b, 162c and 162d in intermitent contact mode. The boundary points A', B' are noted and the surface is scanned along scan line segment 162e to find boundary points D', E', and the center O' in the same manner as that described above in reference to FIG. 7A. After the center O' has been located, however, system 20 is then caused to operate in a contact mode where the tip of probe 26 is caused to contact surface 40' when it is scanned along scan line segment 162f' through the center O' to measure the feature.

In FIG. 7C, the boundary points A', B', D', E' and the center O' of feature 30' are first located by scanning the tip of probe 26 along scan line segments 182a, 182b, 182c, 182d and 182e in a manner similar to that described above in reference to FIG. 7B, except that when the probe tip is scanned along segments 182a–182e, the probe tip is not in contact with surface 40'. After the center O' of feature 30' is located, system 20 then is caused to operate in an intermittent contact mode along scan line segment 182f, to measure the feature. Obviously, instead of measuring the feature through an intermittent contact mode along scan line segment 182f as shown in FIG. 7C, it is also possible to measure the feature using non-contact or contact operational modes along such scan line segment. Similarly, in FIG. 7B, it is also possible to measure feature 30' through an intermittent contact mode or non-contact mode. Such and other variations are within the scope of the invention.

Different modes are appropriate for different measurements. For example, to find magnetic or electrical variations, it may be appropriate to use intermitent or non-contact modes. For precise geometric measurements, contact or intermitent contact mode may be more desirable. The feature can have a measurable magnetic characteristic as well as a rough surface. It can be located by in the non-contact mode and its roughness measured in the contact mode. But if such feature is very rough, it may be desirable to measure it in the intermittent contact mode instead to avoid damage to the tip or surface to avoid frictional effects inherent in a constant contact technique.

The scanning speed during the intermittent contact mode can also be faster than that in the contact mode. Then after the feature has been located and its center identified, the feature, such as its profile or geometry can then be measured through an operational mode different from that used in locating the feature and its center if desired or necessary. Thus, when measurement of the geometry or profile of the feature is desired, system 20 would then be operated in either the contact mode or the intermittent contact mode.

In some applications, it may be desirable to be able to locate the boundaries and/or the center of the feature more accurately. For such applications, it may be desirable to repeat the above-described searching process, but at a finer resolution. This is illustrated in FIG. 7D. As shown in FIG. 7D, the target area 40 of the surface is first scanned by means of the probe tip along scan line segments 192(1), 192(2) and 192(3), where the approximate location of feature 30" is discovered during the scan along 192(3). Then a smaller target area 40" is defined to enclose the feature 30" and the searching process is repeated along scan line segments 194(1), 194(2) . . . , where the spacing between adjacent scan lines is smaller than that between the scan lines 192(1), 192(2) and 192(3). If desired, the entire target area 40" may be scanned to locate the boundary points of the feature more accurately. If different boundary points such as A", B", A'", B'" are taken into account for determining the location for transverse scan 196 than just the midpoint corresponding to only two boundary points such as A", B", the center of feature 30" can be more accurately located. For example, a more accurate location can be identified by taking an average position between the midpoint corresponding to boundary points A", B" and the midpoint corresponding to only two boundary points such as A'", B'".

In order to measure the profile or geometry of a surface, in reference to FIG. 8A, system 20 lifts the probe tip by a predetermined distance h from the surface, record the lateral distance δx traveled by the tip before it is lowered again to touch the surface and record the distance by which the probe tip has been lowered before it touches the surface again. Preferably, the tip is again lifted from such point of contact by the distance h, moved laterally by distance δx, lowered again to touch the surface, and the distance that the tip is lowered again recorded. This process is then repeated until the scan across the target area is completed. A record of such distance δx and the distances that the tip is repeatedly lowered before it touches the surface in the intermittent contact mode throughout the scan will give an indication of the geometry or profile of the surface.

In the embodiment of FIG. 8A, the probe tip is lifted after it is lowered to touch the surface 200, without dragging the probe tip along the surface. In other words, the probe tip is caused to gently tap surface 200 before it is lifted and the probe tip is not moved laterally across the surface while it is contact with the surface. In some applications, it may be desirable to drag the probe tip along the surface after the tip is lowered to touch the surface, in an embodiment illustrated in FIG. 8B. After the probe tip has been dragged along the surface 200 for a predetermined distance, the probe tip is again lifted by a predetermined distance, such as h, moved laterally by a predetermined distance, and then again lowered to touch the surface 200. After the tip touches the surface, the tip is again dragged along the surface for a predetermined distance and the above-described processes repeated until a scan across the entire target area is completed as before. In the operational mode of FIG. 8B, in addition to recording the quantities h, δx and the distances by which the tip is repeatedly lowered before it touches the surface in the intermittent contact mode throughout the scan, system 20 also records the change in height of the probe tip when the tip is dragged along the surface 200. Such information, in conjunction with h, δx, and the distances by which the tip is lowered before it touches the surface, will give an indication of the geometry or profile of the surface when system 20 is operated in the mode indicated in FIG. 8B.

Yet another operational mode of system 20 in the intermittent contact mode is illustrated in FIG. 8C. Such mode is similar to that in FIG. 8A, where in the operational modes of both FIGS. 8A and 8C, the probe tip is not moved laterally to drag the tip across the surface after the tip is lowered to touch the surface, but is lifted to a predetermined height h. However, instead of moving the probe tip up and down and laterally along substantially straight lines as in FIG. 8A, the tip in FIG. 8C is moved along a more or less sinusoidal path across surface 200 until it scans across the target area. Such and other variations are within the scope of the invention.

A number of different types of features can be located and measured in the manner described above. In the semiconductor industry, it is frequently desirable to locate a tungsten plug, or a metal cluster or metal filled via hole, for measurement of a specific geometric, magnetic or electrical parameter. Thus, the tungsten plug, metal cluster or via hole filled with a metallic material may be located by sensing for changes in capacitance, magnetic fore, electrical resistance or geometric properties of the site. Thus, when system 20 is operated in a non-contact operational mode, where thee tip is held at a small distance above the surface and scanned at a high speed over the surface along a search pattern, the sensor 28 senses changes in capacitance, tunneling current or magnetic parameter (e.g. magnetic force experienced by the probe tip and sensor 24) of the surface. The change in capacitance, tunneling current or magnetic force may indicate location of a tungsten plug, metal cluster or via hole filled with a metal. Once this location is determined, the stylus or probe can be brought into contact or close proximity to the surface to measure the electrical, magnetic or geometric properties of the site. Alternatively, system 20 may be operated in an intermittent contact mode and the resistance, capacitance or, magnetic parameter, of the surface sensed at each location by sensor 24. When the resistance, capacitance or magnetic parameter changes, this may indicate the location of the tungsten plug or metal cluster or via hole. For example, the change in resistance may be indicated by the change in the amount of current flow between the stylus tip and the surface. If the amount of current flow increases, it may mean that the stylus is either at or at close proximity to a tungsten plug, metal cluster or via hole. When the tip is in contact or in close proximity to the plug, cluster or via hole, maximum current can be expected to pass. Also when the spacing between the tip and the plug, cluster or metal filled via hole is decreased, the capacitance between the probe tip and the surface is also decreased, because the dielectric effect of space between the surface and tip decreases with the spacing. When the tip is moving closer to the feature such as a plug or cluster made of a magnetic material or via hole filled with such material, the magnetic force between the probe tip and the feature may also increase until a maximum value when the feature and tip are in contact. This allows the user to locate the plug, cluster or via hole. After the plug, cluster or via hole has been located, the electrical, optical, magnetic or geometric characteristic of the feature can then be measured. The above-described effects may be detectable and the features can be sensed in the contact, intermittent contact or non-contact mode.

The above description applies to a process of locating and measurement of a magnetic feature by means of a magnetic parameter such as magnetic force. This can be performed by means of a magnetic force microscope which measures the magnetic force exerted between the sensor 24 and a feature of a surface, such as a magnetic domain. Such magnetic domain may be a pole tip recession on a magnetic read/write head. Such magnetic force microscope may employ an atomic force microscope or a profilometer in AC or DC modulation modes as described in known magnetic microscope applications. Magnetic force microscopy is described by P. Grütter, H. J. Mamin and D. Rugar in *Springer Series in Surface Science*, Vol. 28, entitled "Scanning Tunneling Microscopy II", Eds. R. Wiesendanger and H. J. Güntherodt, published by Springer-Verlag Berling Heidelberg 1992, pp. 152–207.

Another characteristic of a parameter that may be used to locate a feature is tunnelling current between the feature and the probe tip. For example, a metal cluster on a semiconductor surface may have a radically different current tunnelling characteristic to the probe than the semiconductor surface.

Still other possible features that may be located and measured by means of the invention are unfilled via holes and surface bumps or valleys on laser textured hard disks. The uniformity in size of these bumps and valleys is a key factor in the manufacture of hard disks. There may also be a variety of different sizes and shapes of these bumps on the disks. The bumps may have a donut shape or be asymmetrical about one or more axis. The pattern of such textured disks is generally known and the user is usually interested in measuring some key features of several of these bumps around the disk. This means that exact positioning of a bump or valley under the probe tip or stylus for measurement is desirable. The bumps can vary in size from 1 to 10 microns in lateral dimensions and a height of 100 to 1,000 Angstroms. The approximate locations of such bumps and valleys and the centers of such bumps and valleys may be located by means of the methods described above, in particular the methods described in reference to intermittent contact and contact modes for locating a geometric feature. Where intermittent contact mode is employed, the values of $\delta x$ and height h employed in reference to FIGS. 8A–8C are chosen so that it is unlikely for the probe tip to "jump over" the bump or valley. A suitable range for h may be 10–1,000 Angstroms, and a suitable value for $\delta x$ may be a fraction of the expected size of the feature or object. Thus, the bumps may have a donut shape of 5 micron diameter with a protrusion at the center of the donut. Of interest are the diameters of the bump along two orthogonal axes in the plane of the surface about the center of the bump, the height of the lip (the protrusion at the outer perimeter of the laser bump) of the bump and the height of the raised protrusion at the center of the bump relative to the non-textured area in a close vicinity of the bump.

Where it is desirable to locate a step on a surface, the user may wish to find the approximate location of the step by moving the probe tip in an intermittent contact mode. After the approximate location of the step has been found, the user may wish to rescan such approximate location in a contact mode. After the location of the step has been found, the user may lift the probe tip or stylus off the surface by a known distance until it clears the step, moves it laterally over the step and then lowers the tip across the surface until it touches the top of the step. The difference between the distance that the tip has been lifted and the distance that the tip has been lowered yields an indication of the height of the step. Alternatively, after the location of the step has been found, the probe tip may be caused to move across the surface at the step in contact mode, with the probe tip scaling or climbing the step by means of a sideways sensor. Once the step is sensed, the sensor can be used to measure the topography of the sidewall of the step or a trench, or a tungsten plug or a via hole by means of a sideways sensing technique such as that described in U.S. Pat. No. 5,347,854.

Other features of a surface that can be located and measured by means of this invention include rough spots on a smooth surface or a smooth spot on a rough surface. The operating system 20 in a contact mode or an intermittent contact mode such as shown in FIG. 8B can be used employing a friction sensor to sense the change in friction between the probe tip or stylus and the surface. A suitable friction sensor is described by M. Hipp, H. Bielefeldt, J.

Colchero, O. Marti and J. Mlynek in "A Stand-alone Scanning Force and Friction Microscope", *Ultramicroscopy*, 42–44(1992), pp. 1498–1503, Elsevier Science Publishers.

In the description above, the probe tip is scanned along scan line segments that are substantially parallel to one another. This is,. however, not required and other search paths are possible as illustrated in FIGS. 9, 10 and 11.

Instead of scanning the probe tip along substantially parallel scan lines, the feature 30' in window 40' of the surface may be located by means of a substantially random positioning scheme illustrated in FIG. 9. First a grid mesh 198 is superimposed on the window 40'. The size of the grids in the mesh is selected to be smaller than the expected size of the feature or object of interest to be located. For example, the grids may have dimensions that are within 50% to 85% of the expected size of the feature or object of interest. As shown in FIG. 9, a sequence of substantially random locations or positions a, b, c, d, e, f, . . . (where the sequence is not shown beyond location f in FIG. 9 for reasons apparent below) at the grid intersection points 199 is first generated within the window 40' of the surface, and system 20 causes the probe tip to be positioned sequentially at each one of these positions in the sequence specified: a, b, c, d, e, f, . . . . As illustrated in FIG. 9, the probe tip senses for the first time the presence of the feature 30' when it is placed or positioned in position f. To discover more information about the feature at this point, it is more efficient not to follow the sequence of random positions a, b, c, d, e, f, . . . beyond f but to follow a different positioning scheme. Instead, it may be preferable to then scan the probe tip consecutively along two transverse directions. For example, the probe tip may be scanned along two orthogonal directions X, Y in FIG. 9 in order to locate the center of the feature in the manner described above in reference to FIGS. 6D–6F. Once the center of the feature has been located, the probe tip is then scanned over such center in order to measure the feature.

In another embodiment, after the feature is discovered at location f by positioning the tip at a sequence of random locations, in order to find out more information about the feature such as its boundary, the probe tip may be moved along the +X, −X, +Y, −Y axis in any order in order to find the boundary of feature 30' along the new axis. The boundary may be found by sensing changes or variations in a parameter detected by the tip or sensor.

Thus, the probe tip may be first-moved along the positive Y axis to position 1 and then position 2 from position f to locate the boundary in such direction. After the boundary in such direction has been discovered when the probe tip moves from position 1 to position 2, it is discovered that position 2 is outside the boundary. The probe then may be moved to position 3 which is along the positive X direction from position 1. It is discovered that position 3 is within the feature and the tip is moved consecutively to positions 4 and 5, discovering that both positions are outside the feature, so that position 3 is at the boundary of the feature. The tip is then moved in the −Y direction from position 3 to position 6 discovering that it is still within the feature. The probe tip is then moved to position 7, 8 along the X direction discovering that these are within the feature, and moved to position 9 along the Y axis, discovering that it is outside the feature. It is then moved to position 10, finding that it is within the feature. Therefore, an approximation of the boundary of the feature can be obtained by drawing a fine linking positions 1, 3, 6, 7, 8, 10. In a similar manner, the remaining portion of the boundary can be discovered and an approximation of such boundary indicated by drawing a line through positions 10, 13, 16, 18, 20, 22, 24, 27, 29, and back to position 1. In the above-described process, system 20 will record the positions of the tip where sensing of the feature has been performed and the results of such sensing.

Another method that can be used for locating the feature 30" on a surface is to scan the probe tip along a spiral path, such as in the manner illustrated in FIG. 10. As shown in FIG. 10, probe tip 26 is scanned, beginning at position 200 a path along the direction shown by arrow 202. When the probe tip returns to the beginning position 200, it then starts a spiral scan along path 204. The spiral scan is such that adjacent portions of the scan path have different curvatures and, therefore, different angles of curvature. As illustrated in FIG. 10, for example, the spiral path at position 206 has a curvature angle of $\theta$ whereas the adjacent portion of the curve at position 208 has an angle of curvature of $\phi$, where $\phi$ is greater than $\theta$. In other words, the angle of curvature increases as the tip moves along the spiral path, so that the probe tip zooms into a smaller and smaller area in order to locate the feature. The change in angle of curvature is such that adjacent portions (such as portions at positions 206, 208) of the spiral path are not spaced further apart by more than the expected dimensions of the feature. As shown in FIG. 10, the probe tip senses the presence of the feature at or close to position 208. At such position, the angle of curvature of the spiral path is increased so that the spiral path would cover a smaller area than it otherwise would if the feature has not been located. This will speed up the process of finding the boundaries of the feature. The positions of the tip where boundary of the feature has been sensed (such as by sensing variation in a characteristic of the feature) are recorded to define more accurately the location of the feature.

Thus, in general, a predetermined scan path may be first adopted to locate the approximate location of the feature. Once this has been accomplished, it may be advantageous to stop scanning along such path, and to scan the tip along a different path to find out more information about the feature. The above referenced predetermined path may be a set of substantially parallel scan line segments such as 62*a* in FIGS. 6D–6G. Or it may be a sequence of substantially random locations in FIG. 9, or the spiral path in FIG. 10 from point 200 to point 208. After the feature has been located, it may be desirable to switch to a different scan path to more efficiently find out more information about the feature. Thus, in FIGS. 6E–6I, 7A, 7B, 7C, the tip is scanned along paths 72*a*, 162*e*, 182*e*, where information from prior scans are used to determine such paths. In FIG. 9 it may be scanned along the X, Y axes or along the path defined by positions 1, 2, 3, 4, . . . without using information about the prior scan path other than the location where the feature is sensed. In FIG. 10, it is scanned along the path beyond point 208 using information about the angle of curvature of the prior scan path as a reference (to determine the new angle of curvature) as well as the location where the feature is sensed.

Instead of scanning the tip along a curved spiral path as in FIG. 10, the spiral path can be roughly rectilinear, as shown in FIG. 11. As shown in FIG. 11, the probe tip is scanned along paths that spiral in towards a smaller area but along paths where adjacent portions of the paths are substantially parallel to one another. Such and other variations of the spiral path are within the scope of the invention.

Instead of scanning the probe tip along parallel paths by starting always from the same edge, the probe tip can also be scanned along a serpentine path 250 as shown in FIG. 12. Scanning a probe tip along a serpentine path may reduce the amount of time required to scan the same locations of the surface as compared to a scanning scheme where the probe must return to the same edge of the target area before it is scanned across the surface to locate the feature.

The invention has been described by reference to preferred embodiments described above. It will be understood that various changes and modifications may be made without departing from the scope of the invention. Thus, the feature can also be detectable by means of its thermal characteristics, such as thermal conductivity by means of a temperature sensor. As another example, while the invention has been illustrated by reference to features on the surface of samples, the invention is applicable even if the feature is inside the surface as long as characteristics of the feature can be sensed or detected, such as by electrical, magnetic, optical, thermal or other means. The invention herein is defined only by the appended claims and their equivalents.

What is claimed is:

1. A method for locating a feature of a surface, said feature having dimensions, comprising the steps of:
   (a) defining a first target area of the surface for sensing of the feature on the surface,
   (b) scanning a probe tip of a profilometer or scanning probe microscope over the first target area of the surface and sensing the feature wherein the dimensions of the feature are taken into account; and
   (c) stopping scanning the tip after the feature is sensed by the probe tip, irrespective of whether the entire first target area has been scanned, said scanning step (b) comprising scanning the probe tip along a first scan line segment in a scan; and a step (d) of, when the feature is not sensed in any prior scan, moving the probe tip by an offset from the immediately preceding scan segment and scanning the probe tip along a scan line segment substantially parallel to the first scan line segment; wherein step (d) is repeated where necessary until the feature is sensed.

2. The method of claim 1, wherein said moving step moves the tip by an offset that is less than an estimated dimension of the feature.

3. A. The method of claim 2, said offset being about 50% to 85% of the estimated dimension of the feature.

4. The method of claim 1, wherein said scanning step scans the tip along a first predetermined path, said stopping step stopping the scan along said predetermined path, irrespective of whether the entire target area has been scanned along said predetermined path.

5. The method of claim 4, wherein said scanning step scans the tip along a first predetermined path, said method further comprising scanning the tip across the surface not along said predetermined path, but along a second path, wherein said second path is laterally distinct from the predetermined path.

6. The method of claim 5, further comprising:
   sensing information on the feature along said first predetermined path; and
   using said information to determine said second path.

7. A method for locating a feature of a surface, said feature having dimensions, comprising the steps of:
   (a) defining a first target area of the surface for sensing of the feature on the surface;
   (b) scanning a probe tip of a profilometer or scanning probe microscope over the first target area of the surface and sensing the feature wherein the dimensions of the feature are taken into account; and
   (c) stopping scanning the tip after the feature is sensed by the probe tip irrespective of whether the entire first target area has been scanned
   wherein said sensing step senses the feature through physical contact of the tip with the surface, and wherein said sensing step includes:
   causing intermittent contact of the tip with the surface, wherein after each of at least some of such contacts, the tip is raised to a height above the surface after each contact, moved laterally across the surface and lowered until the tip touches the surface; and
   measuring the distance by which the tip is lowered said method further comprising sensing the feature by monitoring position of the tip.

8. The method of claim 7, step (b) comprising the step of sensing the feature by means of a magnetic, capacitance or electrical current parameter.

9. The method of claim 7, wherein step (b) scans the tip along a serpentine path, said serpentine path spread laterally over the surface.

10. A method for locating a feature of a surface, said feature having dimensions, comprising the steps of:
    (a) defining a first target area of the surface for sensing of the feature on the surface;
    (b) scanning a probe tip of a profilometer or scanning probe microscope over the first target area of the surface and sensing the feature wherein the dimensions of the feature are taken into account; and
    (c) stopping scanning the tip after the feature is sensed by the probe tip, irrespective of whether the entire first target area has been scanned;
    said scanning step being performed with the tip being in intermittent or substantially constant contact with the surface, said scanning step including causing the tip repeatedly to be touching and be lifted from the surface, wherein said causing step causes the tip to drag along the surface.

11. A method for locating a feature of a surface, said feature having dimensions comprising the steps of:
    (a) defining a first target area of the surface for sensing of the feature on the surface;
    (b) scanning a probe tip of a profilometer or scanning probe microscope over the first target area of the surface and sensing the feature wherein the dimensions of the feature are taken into account; and
    (c) stopping scanning the tip after the feature is sensed by the probe tip, irrespective of whether the entire first target area has been scanned, said scanning step including:
    selecting a random sequence of at least one location in the target area; and
    causing the tip to be positioned sequentially at each of said locations in the sequence until the feature is sensed.

12. The method of claim 11, further comprising, after step (c), finding any variation of the feature over said surface to find a boundary of the feature.

13. The method of claim 12, wherein said finding step finds an areal extent of the feature.

14. The method of claim 13, wherein said finding step causes the tip to move along two directions transverse to each other.

15. The method of claim 13, wherein said finding step causes the tip to find a boundary of the feature.

16. The method of claim 11, further comprising sensing the feature by means of the tip at each of said locations in the sequence.

17. The method of claim 16, further comprising recording the locations where the tip has been used to sense the feature.

18. The method for locating and measuring a feature of a surface, said feature having dimensions, comprising the step of:
  (a) defining a target area of the surface for sensing of the feature on the surface;
  (b) scanning a probe tip of a profilometer or scanning probe microscope over the target area of the surface and sensing the feature wherein the dimensions of the feature are taken into account;
  (c) stopping scanning the tip after the feature is sensed by the probe tip, irrespective of whether the entire target area has ben scanned; and
  (d) measuring the feature using the tip, said scanning step (b) comprising scanning the probe tip along a first scan line segment in a scan; and said method further comprising a step (e) of, when the feature is not sensed in any prior scan, moving the probe tip by an offset from the immediately preceding scan segment and scanning the probe tip along a scan line segment substantially parallel to the first scan line segment; wherein step (e) is repeated where necessary until the feature is sensed.

19. The method of claim 18, further comprising a step (c1), performed after step (c) and before step (d), of scanning said tip along a second scan line segment transverse to the first scan line segment to locate the feature.

20. The method of claim 19, wherein the steps (b), (c1) are performed with the tip spaced apart from the surface.

21. The method of claim 19, wherein the sensing step causes the tip to sense a magnetic, capacitive, electrical current or van der Waals parameter of the feature during the steps (b) and (c1).

22. The method of claim 18, wherein the measuring step is performed with the tip in substantial contact with the surface.

23. The method for locating and measuring a feature of a surface, said feature having dimensions, comprising the steps of:
  (a) defining a target area of the surface for sensing of the feature on the surface;
  (b) scanning a probe tip of a profilometer or scanning probe microscope over the target area of the surface and sensing the feature wherein the dimensions of the feature are taken into account;
  (c) stopping scanning the tip after the feature is sensed by the probe tip irrespective of whether the entire target area has been scanned; and
  (d) measuring the feature using the tip, wherein the feature is sensed by the tip during the scanning step (b) by means of a first parameter, said measuring step measuring the feature by means of a second parameter, wherein the first and second parameters are different.

24. The method of claim 23, wherein the measuring step measures an electrical or geometric parameter of the feature.

25. The method for locating and measuring a feature of a surface, said feature having dimensions, comprising the steps of:
  (a) defining a target area of the surface for sensing of the feature on the surface;
  (b) scanning a probe tip of a profilometer or scanning probe microscope over the target of the surface and sensing the feature wherein the dimensions of the feature are taken into account;
  (c) stopping scanning the tip after the feature is sensed by the probe tip, irrespective of whether the entire target area has been scanned; and
  (d) measuring the feature using the tip, said method further comprising locating a center of the feature, wherein the measuring step measures the feature substantially at the center of the feature.

26. The method of claim 25, said measuring step including scanning the surface along directions at a predetermined spatial relation to the center.

27. The method of claim 25, said measuring step including passing the tip over said center.

28. The method of claim 25, wherein said scanning step scans the tip along a first predetermined path, said stopping step stopping the scan along said predetermined path, irrespective of whether the entire target area has been scanned along said predetermined path.

29. The method of claim 28, further comprising scanning the tip across the surface not along said predetermined path, but along a second path, wherein said second path laterally distinct from the predetermined path.

30. The method for locating and measuring a feature of a surface, said feature having dimensions, comprising the steps of
  (a) defining a target area of the surface for sensing of the feature on the surface;
  (b) scanning a probe tip of a profilometer or scanning probe microscope over the target area of the surface and sensing the feature wherein the dimensions of the feature are taken into account;
  (c) stopping scanning the tip after the feature is sensed by the probe tip, irrespective of whether the entire target area has been scanned; and
  (d) measuring the feature using the tip, wherein said scanning step scans the tip along a first predetermined path said method further comprising:
    scanning the tip across the surface not alone said predetermined path, but along a second path;
    said stopping step stopping the scan along said first predetermined path, irrespective of whether the retire target area has been scanned along said predetermined path;
    scanning the tip across the surface not along said first predetermined path, but along a second path;
    sensing information on the feature along said first predetermined path; and
    using said information to determine said second path.

31. A method for locating a feature on or in a surface of a laser textured hard disk, said feature including a bump or valley, comprising the steps of:
  (a) defining a target area of the surface for sensing of the feature on the surface;
  (b) scanning a probe tip of a profilometer or scanning probe microscope over the target area of the surface and sensing the feature; and
  (c) stopping scanning the tip after the feature is sensed by the probe tip, irrespective of whether the entire target area has been scanned.

32. The method of claim 31, said scanning step (b) comprising scanning the probe tip along a first scan line segment in a scan; and a step (d) of, when the feature is not sensed in any prior scan, moving the probe tip by an offset from the immediately preceding scan segment and scanning the probe tip along a scan line segment substantially parallel to the first scan line segment; wherein step (d) is repeated where necessary until the feature is sensed.

33. The method of claim 32, further comprising (e), after the bump or valley has been sensed by the probe tip, scanning said tip along a second scan line transverse to the first scan line segment in a second scan to locate the bump or valley.

34. A method for locating and measuring a feature on or in a surface of a laser textured hard disk, said feature including a bump or valley, comprising the steps of:
   (a) defining a target area of the surface for sensing of the feature on the surface;
   (b) scanning a probe tip of a profilometer or scanning probe microscope over the target area of the surface and sensing the feature;
   (c) stopping scanning the tip after the feature is sensed by the probe tip, irrespective of whether the entire target area has been scanned; and
   (d) measuring the feature.

35. The method of claim 34, said scanning step (b) comprising scanning the step of the probe tip along a first scan line segment in a scan; and the step (e) of, when the feature is not sensed in any prior scan, moving the probe tip by an offset from the immediately preceding scan segment and scanning the probe tip along a scan line segment substantially parallel to the first scan line segment; wherein step (e) is repeated where necessary until the feature is sensed.

* * * * *